US008806072B2

(12) United States Patent
Uehara

(10) Patent No.: US 8,806,072 B2
(45) Date of Patent: Aug. 12, 2014

(54) INFORMATION PROCESSING APPARATUS, INFORMATION PROCESSING METHOD, AND COMPUTER PROGRAM PRODUCT

(75) Inventor: Noriyuki Uehara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 221 days.

(21) Appl. No.: 13/396,893

(22) Filed: Feb. 15, 2012

(65) Prior Publication Data

US 2012/0226828 A1 Sep. 6, 2012

(30) Foreign Application Priority Data

Mar. 1, 2011 (JP) ................................. 2011-044414

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .............................................. 710/8; 719/327

(58) Field of Classification Search
CPC .. G06F 9/4411; G06F 3/00; G06F 2221/2129
See application file for complete search history.

(56) References Cited

U.S. PATENT DOCUMENTS

| 2002/0143921 A1* | 10/2002 | Stephan | 709/223 |
| 2008/0189722 A1* | 8/2008 | Lin et al. | 719/321 |
| 2010/0199290 A1* | 8/2010 | Kavanaugh | 719/327 |

FOREIGN PATENT DOCUMENTS

| JP | 2006-239969 | 9/2006 |
| JP | 2010-39616 | 2/2010 |
| JP | 2010-165128 | 7/2010 |

\* cited by examiner

*Primary Examiner* — Ernest Unelus
*Assistant Examiner* — Ronald Modo
(74) *Attorney, Agent, or Firm* — Oblon, Spivak, McClelland, Maier & Neustadt, L.L.P.

(57) ABSTRACT

An information processing apparatus provided with a unit that acquires identification information indicating a function of an external device connected to a connector, a holding unit that holds a device driver to control the external device, and a control unit to control an assignment of the device driver to the external device in accordance with control information. The holding unit holds a generic device driver to perform a process not dependent on the function of the external device. If the control information indicates a first value, the control unit assigns the generic device driver to the external device. If the control information indicates a second value, the control unit determines whether the holding unit holds a device driver compatible with the indicated function. If it is determined that the holding unit does not hold the device driver, the control unit assigns the generic device driver to the external device.

7 Claims, 8 Drawing Sheets

FIG.4

| VENDOR ID | PRODUCT ID |
|---|---|
| 0x0001 | 0x0002 |
| 0x0003 | 0x0004 |
| ... | ... |

| OFFSET | FIELD NAME | SIZE [BYTE] | DESCRIPTION |
|---|---|---|---|
| 0 | bLength | 1 | BYTE LENGTH OF DESCRIPTOR |
| 1 | bDescriptorType | 1 | TYPE OF DESCRIPTOR |
| 2 | bcdUSB | 2 | RELEASE NUMBER OF USB SPECIFICATIONS |
| 4 | bDeviceClass | 1 | CLASS CODE |
| 5 | bDeviceSubclass | 1 | SUB-CLASS CODE |
| 6 | bDeviceProtocol | 1 | PROTOCOL CODE |
| 7 | bMaxPacketSize0 | 1 | MAXIMUM PACKET LENGTH OF ENDPOINT 0 |
| 8 | idVendor | 2 | VENDOR ID |
| 10 | idProduct | 2 | PRODUCT ID |
| 12 | bcdDevice | 2 | VERSION OF DEVICE (BCD) |
| 14 | iManufacturer | 1 | INDEX OF STRING DESCRIPTOR FOR VENDOR |
| 15 | iProduct | 1 | INDEX OF STRING DESCRIPTOR FOR PRODUCT |
| 16 | iSerialNumber | 1 | INDEX OF STRING DESCRIPTOR FOR SERIAL NUMBER |
| 17 | bNumConfiguration | 1 | NUMBER OF CONFIGURATIONS |

FIG.6

| OFFSET | FIELD NAME | SIZE [BYTE] | DESCRIPTION |
|---|---|---|---|
| 0 | bLength | 1 | BYTE LENGTH OF DESCRIPTOR |
| 1 | bDescriptorType | 1 | TYPE OF DESCRIPTOR |
| 2 | wTotalLength | 2 | TOTAL NUMBER OF BYTES OF ALL CONFIGURATION DESCRIPTORS AND THEIR DEPENDENT DESCRIPTORS |
| 4 | bNumInterface | 1 | NUMBER OF INTERFACES WITHIN CONFIGURATION |
| 5 | bConfigurationValue | 1 | CONFIGURATION IDENTIFIER |
| 6 | iConfiguration | 1 | INDEX OF STRING DESCRIPTOR FOR CONFIGURATION |
| 7 | bmAttributes | 1 | BIT 6: 1 (SELF POWER)/0 (BUS POWER) BIT 5: REMOTE WAKEUP SUPPORT |
| 8 | bMaxPower | 1 | MAXIMUM CURRENT VALUE FOR BUS POWER REQUIREMENT (1/2) |

FIG.7

| OFFSET | FIELD NAME | SIZE [BYTE] | DESCRIPTION |
|---|---|---|---|
| 0 | bLength | 1 | BYTE LENGTH OF DESCRIPTOR |
| 1 | bDescriptorType | 1 | TYPE OF DESCRIPTOR |
| 2 | bInterfaceNumber | 1 | INTERFACE IDENTIFICATION NUMBER |
| 3 | bAlternateSetting | 1 | VALUE FOR SELECTING ALTERNATE INTERFACE |
| 4 | bNumEndpoint | 1 | NUMBER OF ENDPOINTS SUPPORTED (EXCLUDING ENDPOINT 0) |
| 5 | bInterfaceClass | 1 | CLASS CODE |
| 6 | bInterfaceSubclass | 1 | SUB-CLASS CODE |
| 7 | bInterfaceProtocol | 1 | PROTOCOL CODE |
| 8 | iInterface | 1 | INDEX OF STRING DESCRIPTOR FOR INTERFACE |

FIG.8

| OFF-SET | FIELD NAME | SIZE [BYTE] | DESCRIPTION |
|---|---|---|---|
| 0 | bLength | 1 | BYTE LENGTH OF DESCRIPTOR |
| 1 | bDescriptorType | 1 | TYPE OF DESCRIPTOR |
| 2 | bEndpointAddress | 1 | ENDPOINT NUMBER (INCLUDING DIRECTION) →TELLS ENDPOINT TRANSFER DIRECTION (IN/OUT) |
| 3 | bmAttributes | 1 | DENOTES TRANSFER MODE →CONTROL/BULK /INTERRUPT/ISOCHRONOUS |
| 4 | wMaxPacketSize | 1 | MAXIMUM PACKET SIZE SUPPORTED |
| 5 | bInterval | 1 | MAXIMUM DELAY TIME /POLLING INTERVAL/NAK RATE |

FIG.9

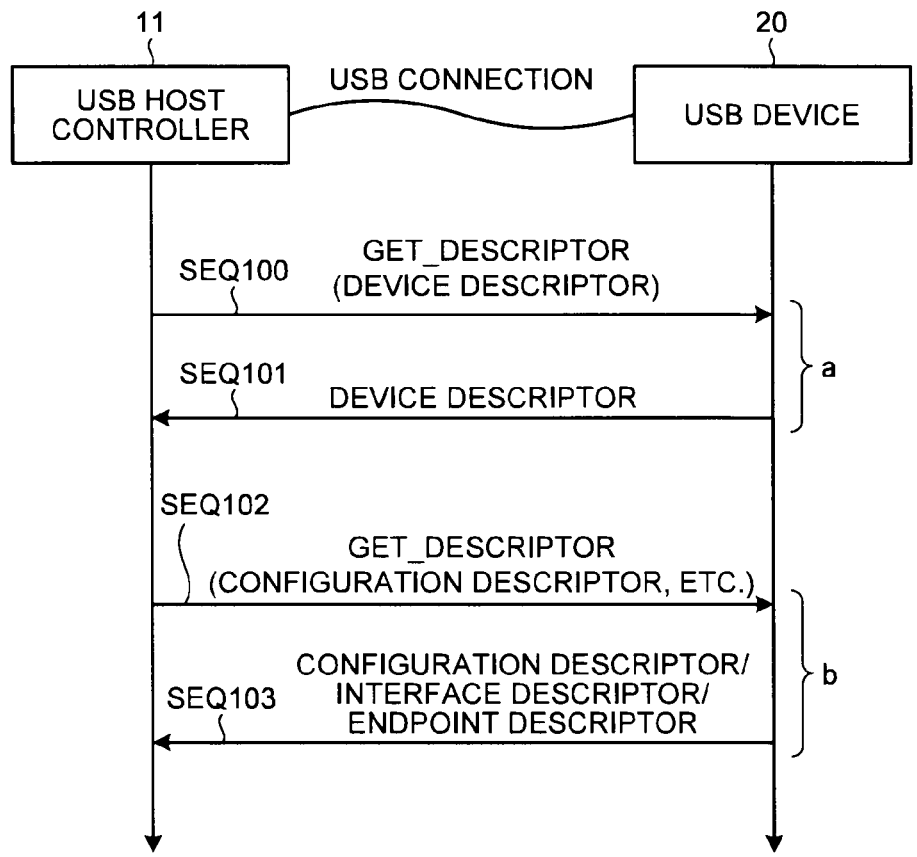

INFORMATION PROCESSING APPARATUS, INFORMATION PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2011-044414 filed in Japan on Mar. 1, 2011.

BACKGROUND OF THE INVENTION

1. Field of the Invention

The present invention relates to an information processing apparatus and method having an interface to which an external device is removably connected, and also relates to a computer program product.

2. Description of the Related Art

Universal serial bus (USB) connection for connecting a host machine and a plurality of peripherals (devices) through serial communication is widely prevalent as a method for connecting between electronic devices. The USB is an interface standard supporting hot swapping that makes it possible to connect or disconnect devices to or from a machine in operation.

Conventionally, when a USB device is connected to a USB interface of a computer, control information is transferred between the USB device and the computer. Through this information transfer process, an operating system (OS) acquires, from the USB device, and checks a descriptor that stores therein information unique to the USB device in question. The descriptor includes information called a "class" that represents an attribute of the USB device. From the class information, the OS determines a device driver appropriate for the USB device in question and automatically assigns the device driver to the USB device.

A special type of USB device is known in which a class different from that to which the USB device originally belongs is set. For example, recent years have witnessed applications of an integrated circuit (IC) card reader that is used through the USB connection. Meanwhile, many OSs are equipped as standard with class drivers that are compatible with a human interface device (HID) class. Setting a USB device that does not belong to the HID class as an HID-class USB device saves labor required for installing a device driver unique to the USB device in question, which enhances convenience.

For example, Japanese Patent Application Laid-open No. 2010-039616 discloses an IC card reader that is not originally categorized as an HID-class USB device, but is set to be categorized into the HID class to thereby use an HID-class device driver.

Japanese Patent Application Laid-open No. 2010-165128 discloses a technique that controls a USB device having a class different from its original one set therefor, through special control performed by an application via a generic USB device driver that does not represent a class driver of its original class. Japanese Patent Application Laid-open No. 2010-165128 describes an example, in which a magnetic card reader mounted as the HID class is used as a device for authentication. According to Japanese Patent Application Laid-open No. 2010-165128, a USB device in which a class different from its original one is set can be used.

To use a USB device for which a class different from that to which the USB device originally belongs is set, an application needs to be made available that can control such that the USB device to which a class driver of a different class is assigned operates properly. If some restrictions hamper use of this application, problems are that the USB device to which the class driver of a different class is assigned cannot be used and, moreover, unexpected operation may result.

The above-described technique disclosed in Japanese Patent Application Laid-open No. 2010-165128 assumes the use of an application for controlling the USB device. If the application cannot be used, therefore, the problem is not solved in that the USB device to which the class driver of a class different from that to which the USB device originally belongs is assigned may not be properly controlled.

SUMMARY OF THE INVENTION

It is an object of the present invention to at least partially solve the problems in the conventional technology.

An information processing apparatus includes an acquiring unit that acquires, from an external device connected to a connector, identification information that indicates at least a function of the external device, a holding unit that holds a device driver for controlling the external device, and a control unit that controls an assignment of the device driver to the external device connected to the connector in accordance with control information. The holding unit holds at least a generic device driver that performs a process not dependent on the function of the external device. If the control information indicates a first value, the control unit assigns the generic device driver to the external device connected to the connector. If the control information indicates a second value, the control unit performs a first determination for determining whether the holding unit holds a device driver compatible with the function of the external device indicated by the identification information acquired from the external device. If it is determined as a result of the first determination that the holding unit does not hold the device driver, the control unit assigns the generic device driver to the external device.

An information processing method includes acquiring, from an external device connected to a connector, identification information that indicates at least a function of the external device, holding a device driver for controlling the external device, and controlling an assignment of the device driver to the external device connected to the connector in accordance with control information. The holding includes holding at least a generic device driver that performs a process not dependent on the function of the external device. If the control information indicates a first value, the controlling includes assigning the generic device driver to the external device connected to the connector. If the control information indicates a second value, the controlling includes performing a first determination for determining whether the holding holds a device driver compatible with the function of the external device indicated by the identification information acquired from the external device. If it is determined as a result of the first determination that the holding does not hold the device driver, the controlling includes assigning the generic device driver to the external device.

A computer program product comprising a non-transitory computer-readable medium having computer-readable program codes embedded therein, the program codes when executed causing a computer to execute acquiring, from an external device connected to a connector, identification information that indicates at least a function of the external device, holding a device driver for controlling the external device, and controlling an assignment of the device driver to the external device connected to the connector in accordance with control information. The holding includes holding at least a generic device driver that performs a process not dependent on the function of the external device. If the control information indicates a first value, the controlling includes assigning the generic device driver to the external device connected to the connector. If the control information indicates a second value, the controlling includes performing a first determination for determining whether the holding holds a device driver compatible with the function of the external device indicated by the identification information acquired from the external device. If it is determined as a result of the first determination that the holding does not hold the device driver, the controlling includes assigning the generic device driver to the external device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a schematic diagram illustrating an exemplary list of identification information for identifying USB devices;

FIG. 5 is a schematic diagram illustrating a device descriptor;

FIG. 6 is a schematic diagram illustrating a configuration descriptor;

FIG. 7 is a schematic diagram illustrating an interface descriptor;

FIG. 8 is a schematic diagram illustrating an endpoint descriptor;

FIG. 9 is a diagram illustrating an exemplary sequence of a descriptor acquiring process;

DETAILED DESCRIPTION OF THE PREFERRED EMBODIMENTS

Configuration Example of First Embodiment

Figure 1:
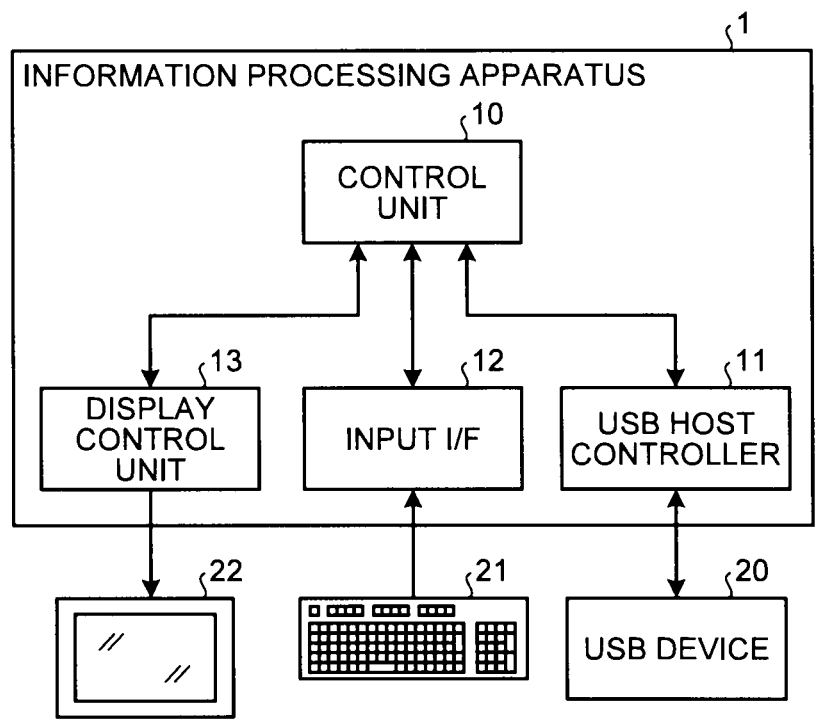
FIG. 1 is a block diagram schematically illustrating an exemplary configuration of an information processing apparatus that can be applied to a first embodiment.

An information processing apparatus and a computer program product according to a first embodiment of the present invention will be described in detail below with reference to the accompanying drawings. FIG. 1 schematically illustrates an exemplary configuration of an information processing apparatus 1 that can be applied to the first embodiment of the present invention. The information processing apparatus 1 includes a control unit 10, a universal serial bus (USB) host controller 11, an input interface (I/F) 12, and a display control unit 13. The control unit 10 includes a central processing unit (CPU), a random access memory (RAM), a read only memory (ROM), and a hard disk drive (HDD), for example. According to a computer program previously stored in the ROM or the HDD and using the RAM as a work memory, the CPU controls general operations of the information processing apparatus 1.

The USB host controller 11 has a USB device connection port for connecting a USB device 20 as an external device. According to control by the control unit 10, the USB host controller 11 controls communication with the USB device 20 connected to the USB device connection port.

An input device 21, such as a keyboard and a pointing device (e.g., a mouse), is connected to the input I/F 12. The input I/F 12 outputs a control signal to the control unit 10 according to a user input made relative to the input device 21. A display 22 is connected to the display control unit 13. The display control unit 13 translates a display control signal generated by the control unit 10 according to the program to a signal having a format to be displayed on the display 22 and outputs a resultant signal to the display 22.

Figure 2:
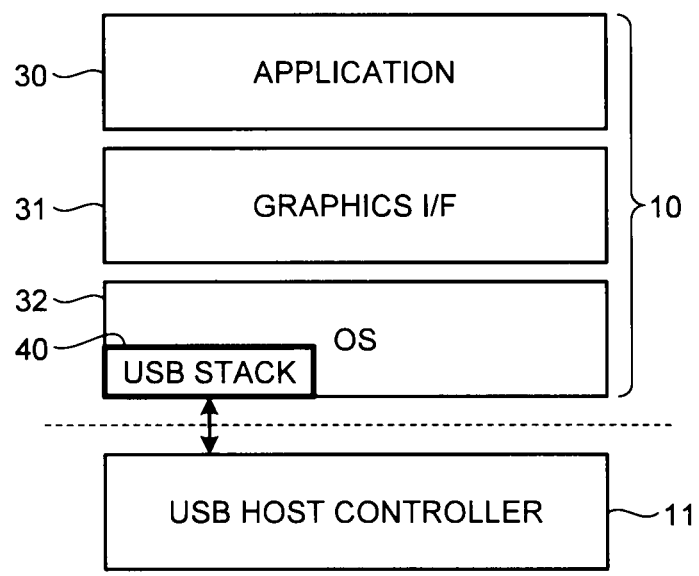
FIG. 2 is an exemplary functional block diagram for describing functions of the information processing apparatus that can be applied to the first embodiment.

FIG. 2 is an exemplary functional block diagram for describing functions of the information processing apparatus 1 illustrated in FIG. 1. In FIG. 2, like or corresponding parts are identified by the same reference numerals as those used in FIG. 1 and detailed descriptions for those parts will be omitted. In FIG. 2, a portion upward of the dotted line represents software operating on the control unit 10, while a portion downward of the dotted line represents hardware. The software operating on the control unit 10 includes an application 30, a graphics interface (I/F) 31, and an OS 32 as a general-purpose operating system (OS). The OS 32 includes a USB stack 40 that mediates between the software and the USB host controller 11, which is hardware.

The application 30 achieves a predetermined function by performing a function call, transmitting a return value of the function call, and transmitting and receiving messages relative to the OS 32. The graphics I/F 31 follows a command from the application 30 or the OS 32 to perform a drawing process, for example. The graphics I/F 31 thereby generates a display control signal for giving a predetermined display and outputs the signal to the display control unit 13. The OS 32 mediates between the software and the hardware and integrally controls computer programs operating in the control unit 10.

Figure 3:
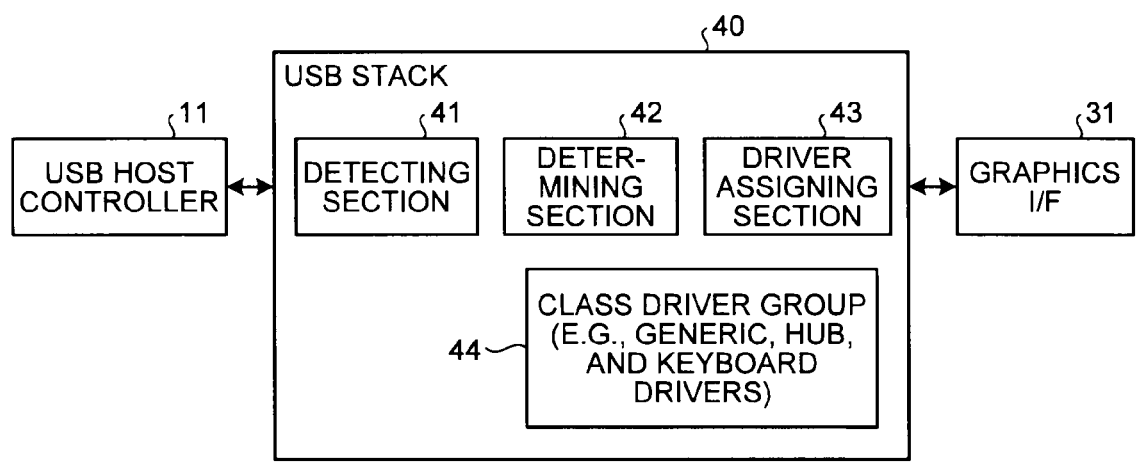
FIG. 3 is an exemplary functional block diagram for describing functions of a USB stack.

FIG. 3 is an exemplary functional block diagram for describing functions of the USB stack 40. In FIG. 3, like or corresponding parts are identified by the same reference numerals as those used in FIG. 1 and detailed descriptions for those parts will be omitted. The USB stack 40 includes a class driver group 44, in addition to a detecting section 41, a determining section 42, and a driver assigning section 43. The USB stack 40 follows a command from the OS 32 to perform communication with the USB host controller 11. In addition, according to a result of the communication with the USB host controller 11, the USB stack 40 outputs, for example, a message for giving a predetermined display. This message is, for example, subjected to a drawing process performed by the graphics I/F 31 (not illustrated) and converted to a corresponding display control signal to be output to the display control unit 13.

In the USB stack 40, the detecting section 41 detects that the USB device 20 is connected to the USB host controller 11. The determining section 42 makes a determination about assignment of a device driver to the USB device 20 detected to be connected by the detecting section 41. Based on a result of the determination made by the determining section 42, the driver assigning section 43 assigns a device driver to the USB device 20 that is currently connected.

The class driver group 44 holds a class driver that is one type of device drivers for controlling the USB device 20. The term "class", as used herein, refers to an abstracted and categorized function of the USB device 20. The class driver is a host device driver for controlling operation of the USB device 20 as a class. The class driver group 44 includes at least a class driver of a generic (general-purpose) class (called a generic class driver). The generic class refers, for example, to a class in which the driver performs only a process not dependent on the USB device function.

The class driver group 44 may include, in addition to the class driver of the generic class, class drivers of other classes, such as a hub class and a keyboard class. Alternatively, other class drivers may be added, as appropriate, to the class driver group 44.

The class driver group 44 further holds a list of identification information that identifies the USB device 20. This list contains registered information that identifies the USB device 20 for which assignment is permitted of a class driver compatible with a class specified by a device descriptor acquired from the USB device 20 as will be described later. FIG. 4 illustrates an exemplary configuration of this list 45. In the example illustrated in FIG. 4, a vendor name "VendorID" and a model name "ProductID" of the USB device 20 are used as the identification information that identifies the USB device 20. The vendor name "VendorID" and the model name "ProductID" use information of fields "idVendor" and "idProduct", respectively, included in the device descriptor to be described later.

For example, the list 45 is empty in a default condition and information is additionally registered therein as necessary according to a process to be performed as will be described later. Instead, information of the USB device 20 operating in a known manner may be registered in the list 45 in advance.

USB Communications Protocol

A communications protocol when the USB device 20 is connected to the USB host controller 11 will be schematically described below. When, for example, the USB device 20 is connected to the USB device connection port of the USB host controller 11, the USB host controller 11 recognizes the USB device 20 and the recognition is notified to the detecting section 41. The USB host controller 11 then assigns an address to the USB device 20 connected thereto.

When the address is assigned to the USB device 20 connected to the USB host controller 11, the USB host controller 11 starts acquiring a descriptor of the USB device 20 in question. In USB communications, the USB host controller 11 acquires the descriptor from the USB device 20 as a target through a control transfer during a communication sequence between the USE host controller 11 and the USB device 20. The descriptor includes information on the target, including characteristics and attributes of the target. The descriptor is classified into four types: a device descriptor, a configuration descriptor, an interface descriptor, and an endpoint descriptor.

In the following, the device descriptor, the configuration descriptor, the interface descriptor, and the endpoint descriptor are collectively called a standard descriptor as appropriate.

The descriptors of these four types will be schematically described with reference to FIGS. 5 to 8. In FIGS. 5 to 8, "offset" indicates the number of bytes from the start. Each of "fields" has a data length indicated on the right of each field name in FIGS. 5 to 8. A specific field can be accessed with the offset and the data length in each descriptor.

FIG. 5 illustrates the device descriptor. The device descriptor contains information for identifying a specific USB device that has transmitted this specific descriptor. Referring to FIG. 5, the device descriptor includes a field bLength, a field bDescriptorType, a field bcdUSB, a field bDeviceClass, a field bDeviceSubclass, a field bDeviceProtocol, a field bMaxPacketSize0, a field idVendor, a field idProduct, a field bcdDevice, a field iManufacturer, a field iProduct, a field iSerialNumber, and a field bNumConfiguration.

Of these fields, the field bLength and the field bDescriptorType denote the byte length and the type of the descriptor, respectively. The field bLength and the field bDescriptorType are provided for each descriptor.

In the device descriptor, the field bDeviceClass, the field bDeviceSubclass, and the field bDeviceProtocol indicate a class of the USB device that has transmitted this specific descriptor. The class denotes a specific category classified based on the function of the USB device. The field idVendor is a vendor ID for identifying a vendor of the USB device that has transmitted this specific descriptor. Similarly, the field idProduct denotes a product of the USB device that has transmitted the descriptor. The field idVendor and the field idProduct allow the model of the USB device to be identified.

FIG. 6 illustrates the configuration descriptor. The configuration descriptor includes USB configuration information of the target and has information indicating the number of interface descriptors. Referring to FIG. 6, the configuration descriptor includes a field bLength, a field bDescriptorType, a field wTotalLength, a field bNumInterface, a field bConfigurationValue, a field iConfiguration, a field bmAttributes, and a field bMaxPower.

FIG. 7 illustrates the interface descriptor. The interface descriptor includes interface information and has information indicating the number of endpoint descriptors the interface has. Referring to FIG. 7, the interface descriptor includes a field bLength, a field bDescriptorType, a field bInterfaceNumber, a field bAlternateSetting, a field bNumEndpoint, a field bInterfaceClass, a field bInterfaceSubclass, a field bInterfaceProtocol, and a field iInterface.

FIG. 8 illustrates the endpoint descriptor. The endpoint descriptor includes information on an endpoint that is a communication port. Referring to FIG. 8, the endpoint descriptor includes a field bLength, a field bDescriptorType, a field bEndpointAddress, a field bmAttributes, a field wMaxPacketSize, and a field bInterval. The configuration descriptor, the interface descriptor, and the endpoint descriptor illustrated in FIGS. 6 to 8 are not closely associated with the present invention and descriptions therefor will be omitted.

FIG. 9 illustrates an exemplary sequence of a descriptor acquiring process. The example illustrated in FIG. 9 illustrates that the USB host controller 11 acquires from the USB device 20 the device descriptor in a process "a" and the configuration descriptor, the interface descriptor, and the endpoint descriptor in a process "b".

Specifically, the USB host controller 11 issues a command GET_DESCRIPTOR as a standard request to the USB device 20 by specifying therein a parameter that defines the device descriptor (SEQ100). In response to this command, the USB device 20 returns the device descriptor to the USB host controller 11 (SEQ101).

Similarly in subsequent steps, the USB host controller 11 issues a command GET_DESCRIPTOR to the USB device 20 by specifying therein a parameter that defines the configuration descriptor, thereby acquiring the configuration descriptor (SEQ102, SEQ103). Similarly, the USB host controller 11 repeats the processes of SEQ102 and SEQ103 to thereby acquire the interface descriptor and the endpoint descriptor from the USB device 20.

Class Driver Assigning Process in First Embodiment

Figure 10:
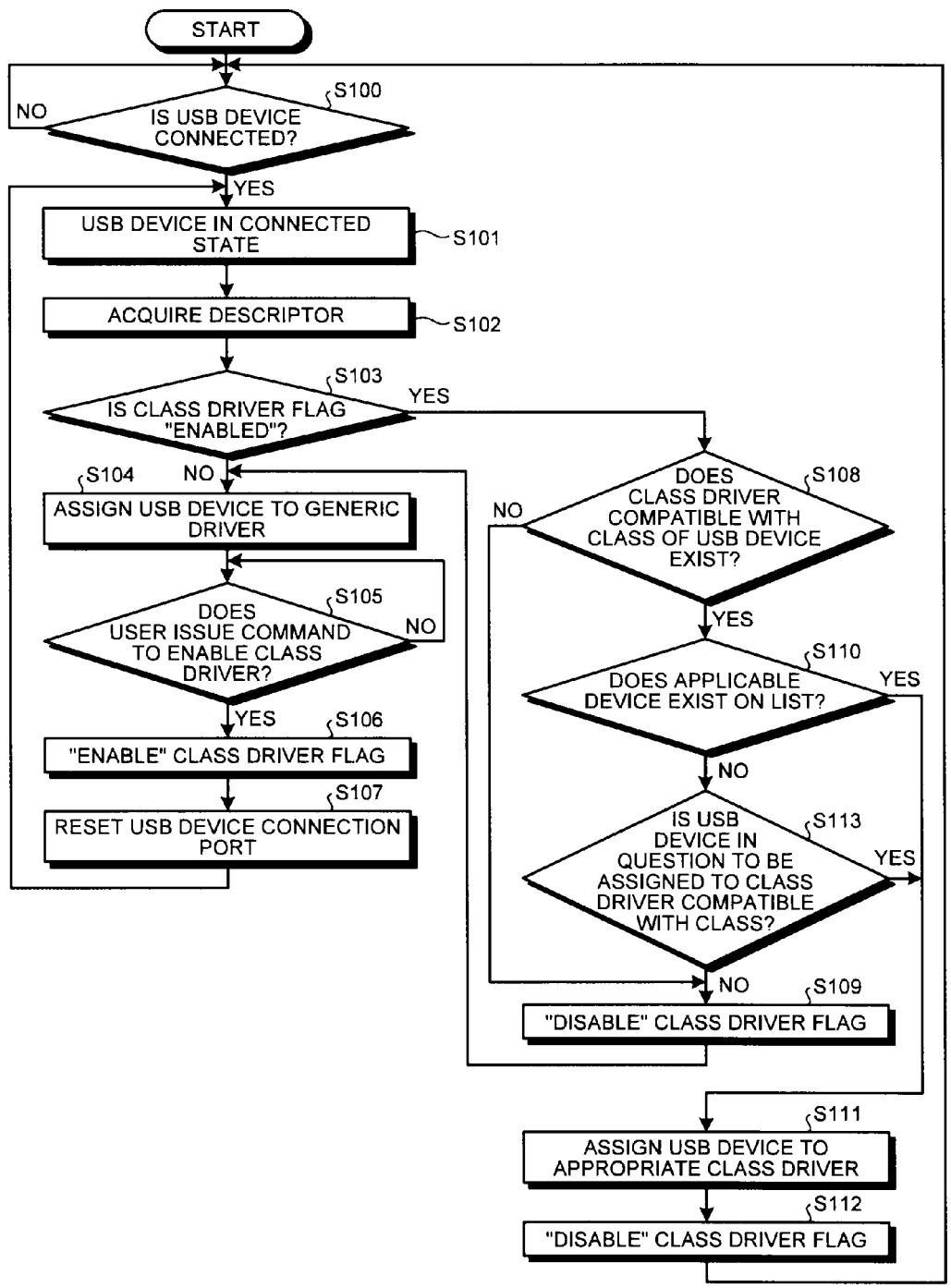
FIG. 10 is an exemplary flowchart illustrating a class driver assigning process for a USB device according to the first embodiment.

A class driver assigning process relative to the USB device 20 according to the first embodiment will be described below with reference to the flowchart in FIG. 10. The process according to the flowchart illustrated in FIG. 10 is performed in the USB stack 40 included in the OS 32 of the control unit 10. Prior to the process of the flowchart illustrated in FIG. 10, the value of a class driver flag that serves as control information for controlling assignment of the class driver is set to a default value representing "disabled".

At step S100, the detecting section 41 detects that the USB device 20 is connected to the predetermined USB device connection port of the USB host controller 11 and, at step S101, an electric connection of the USB device 20 in question to the USB device connection port is established to thereby set the USB device 20 in a connected state. Next, at step S102, the sequence of FIG. 9 described above is followed and the descriptor that the USB device 20 in question has is thereby acquired. The acquired descriptor is passed from the USB host controller 11 onto the USB stack 40.

Then, at step S103, the determining section 42 determines whether the value of the class driver flag indicates "enabled" or "disabled". If it is determined that the value of the class driver flag indicates "disabled", the process proceeds to step S104. At step S104, the driver assigning section 43 assigns the generic class driver to the currently connected USB device 20 that is determined to be in the connected state at step S101.

As described earlier, the generic class driver performs only a process that is not dependent on the function of the USB device 20. Unless the application 30 supports the control of the USB device 20 via the generic class driver, therefore, the currently connected USB device 20 cannot be controlled from the application 30. Thus, there is no chance that the currently connected USB device 20 will operate in an unexpected manner.

However, in a condition in which this generic class driver is assigned, the currently connected USB device 20, even if it is the very one to be used, does not function. The procedure of step S105 and onward is therefore followed and an appropriate class driver is assigned as necessary to the USB device 20 in question.

At step S105 that follows, the USB stack 40 waits for a command from a user to "enable" the class driver flag. When this command is given from the user, the process proceeds to step S106 and the value of the class driver flag is changed to a value indicating "enabled".

For example, the USB stack 40 passes to the graphics I/F 31 a display command for displaying an input screen that prompts the user to input a command to "enable" the class driver flag. Following this display command, the graphics I/F 31 performs a drawing process, and generates a display control signal and outputs the signal to the display control unit 13. The display control unit 13 causes the display 22 to display the input screen according to the display control signal. In response to this input screen, the user operates the input device 21 as necessary to thereby input this command.

If the value of the class driver flag is changed to one that indicates "enabled" at step S106, the process proceeds to step S107, at which the USB stack 40 resets the USB device connection port. At this time, the driver assigning section 43 cancels the assignment of the generic class driver to the USB device 20 currently connected to the USB device connection port. This establishes a condition as if a USB cable of the USB device 20 in question is temporarily disconnected from and then reinserted into the USB device connection port.

When the USB device connection port is reset at step S107, the process returns to step S101.

If it is determined at step S103 mentioned earlier that the value of the class driver flag is one indicating "enabled", the process proceeds to step S108. At step S108, the driver assigning section 43 determines whether the class driver group 44 includes a class driver of the class corresponding to the class of the currently connected USB device 20.

Specifically, the driver assigning section 43 extracts values of the field bDeviceClass and the field bDeviceSubclass included in the device descriptor, from among the descriptors acquired from the USB device 20 in question at step S102, to thereby acquire the class set for the USB device 20 in question. The driver assigning section 43 determines whether a class driver of the class that coincides with the class set for the USB device 20 in question is included in the class driver group 44.

If the driver assigning section 43 determines at step S108 that the class driver of the class that corresponds to the class set for the currently connected USB device 20 is not included in the class driver group 44, the process proceeds to step S109. At step S109, the USB stack 40 changes the value of the class driver flag to one indicating "disabled" and the process proceeds to step S104.

If, on the other hand, the driver assigning section 43 determines at step S108 that the class driver of the class that corresponds to the class set for the currently connected USB device 20 is included in the class driver group 44, the process proceeds to step S110.

At step S110, the driver assigning section 43 refers to the list 45 held by the class driver group 44 to thereby determine whether the currently connected USB device 20 is registered in the list 45. More specifically, the driver assigning section 43 extracts a set of values of the field idVendor and the field idProduct included in the device descriptor, from among the descriptors acquired from the USB device 20 in question at step S102, and determines whether the extracted set of the values is registered in the list 45.

If determining that the currently connected USB device 20 is registered in the list 45, the driver assigning section 43 causes the process to proceed to step S111, at which the driver assigning section 43 assigns an appropriate class driver to the USB device 20 in question. More specifically, the driver assigning section 43 assigns a class driver of the class specified by the device descriptor acquired at step S102 from the currently connected USB device 20 to the USB device 20 in question.

When the class driver is assigned to the USB device 20 at step S111, the process proceeds to step S112, at which the USB stack 40 changes the value of the class driver flag to one indicating "disabled". Then, the process returns to step S100.

On the other hand, if determining at step S110 that the currently connected USB device 20 is not registered in the list 45, the driver assigning section 43 causes the process to proceed to step S113. At step S113, the driver assigning section 43 determines whether to permit the USB device 20 in question to be assigned to the class driver compatible with the class specified by the device descriptor acquired from the currently connected USB device 20.

The determination at step S113 is made according to a user input. For example, the driver assigning section 43 passes to the graphics I/F 31 the command for displaying the input screen that prompts the user to input the determination. The graphics I/F 31 performs a drawing process for the input screen according to this command and generates a display control signal for displaying the drawn input screen. The display control signal is output to the display control unit 13. The display control unit 13 causes the display 22 to display the input screen.

Figure 11:
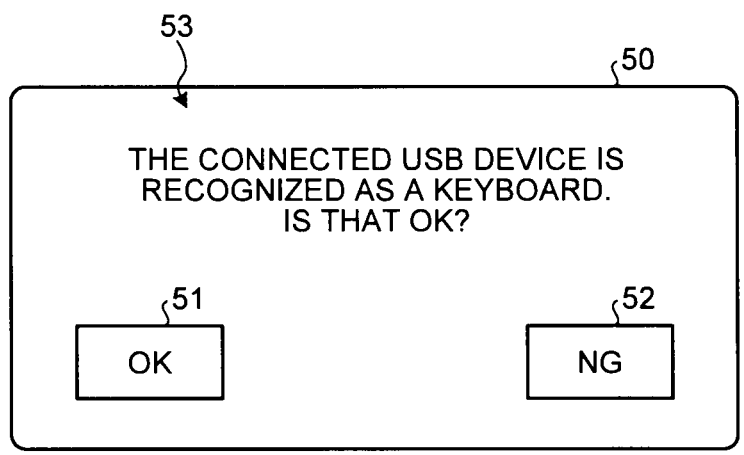
FIG. 11 is a schematic diagram illustrating an exemplary input screen to be displayed on a display.

FIG. 11 illustrates an exemplary input screen 50 to be displayed on the display 22 at step S113. As illustrated in FIG. 11, the input screen 50 displays a message 53 indicating that the class driver of the class specified by the device descriptor acquired from the currently connected USB device 20 is assigned to the USB device 20 in question. In this example, the class acquired is "keyboard" and the message 53 reads "The connected USB device is recognized as a keyboard. Is that OK?" The input screen 50 further displays an OK button 51 for answering in the affirmative, and an NG button 52 for answering in the negative, to the message 53. Following the display of the input screen 50, the user selects either the OK button 51 or the NG button 52 using the input device 21.

If the OK button 51 is selected at step S113, it is then determined that assignment is permitted of the USB device 20 in question to the class driver compatible with the class specified by the device descriptor acquired from the currently connected USB device 20. In this case, the process proceeds to step S111 and the driver assigning section 43 assigns the class driver of the class acquired from the device descriptor of the currently connected USB device 20 to the USB device 20 in question. In addition, identification information (the field idVendor and the field idProduct) that identifies the model acquired from the device descriptor of the USB device 20 in question is added to the list 45.

If the NG button 52 is selected at step S113, on the other hand, it is then determined that the assignment is not permitted of the USB device 20 in question to the class driver compatible with the class specified by the device descriptor acquired from the currently connected USB device 20. In this case, the process proceeds to step S109, at which the USB stack 40 changes the value of the class driver flag to a value indicating "disabled". The driver assigning section 43 assigns the generic class driver to the USB device 20 in question at step S104.

As described heretofore, according to the first embodiment of the present invention, the generic class driver is assigned to the USB device 20 in question at timing immediately after the connection of the USB device 20. Thereafter, whether to assign the class driver of the class acquired from the device descriptor of the USB device 20 in question to the USB device 20 in question is determined based on the selection made by the user. Therefore, even if a class different from that to which the USB device 20 in question originally belongs is set, the USB device 20 in question can be prevented from operating in an unexpected manner.

Second Embodiment

Figure 12:
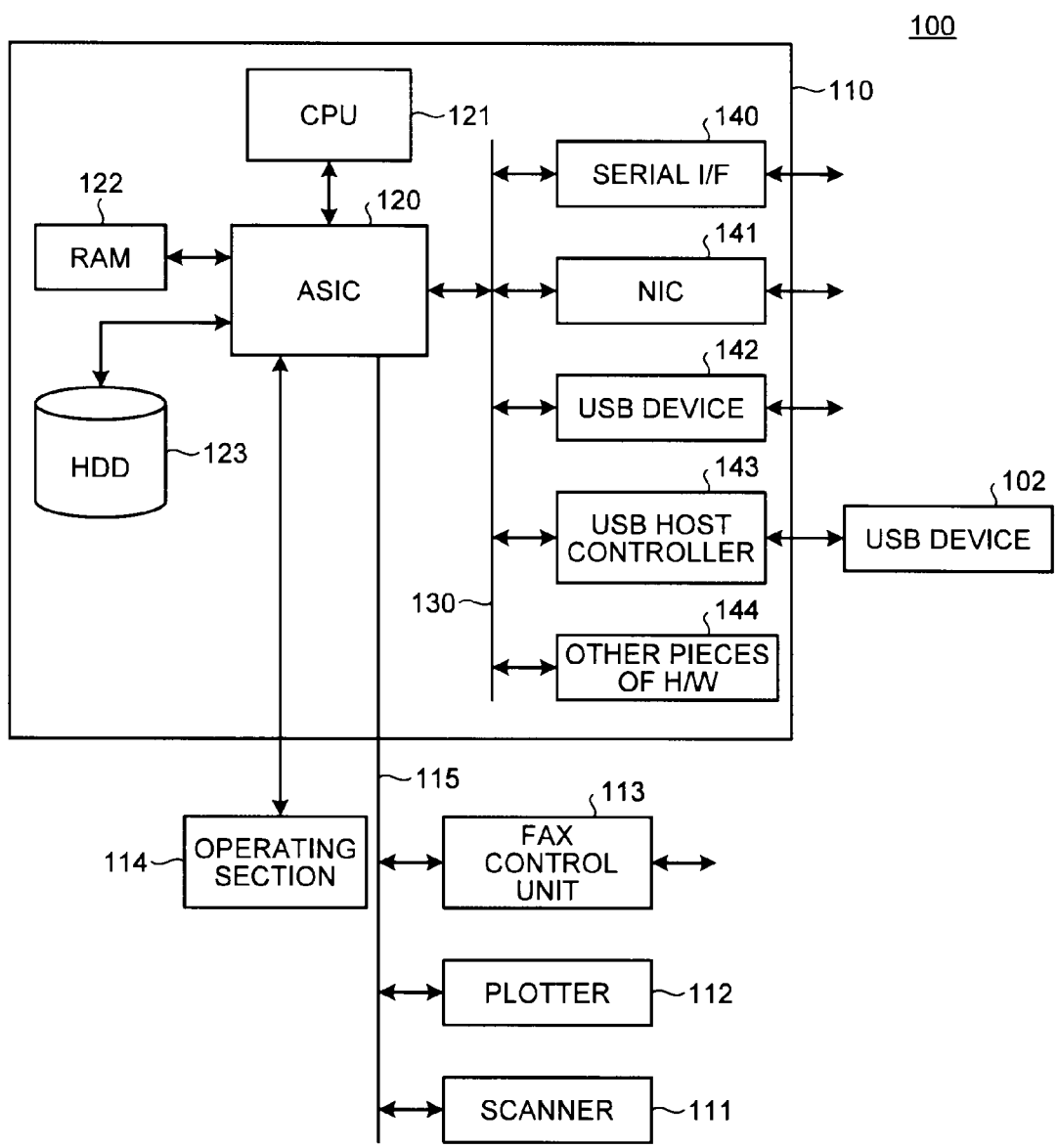
FIG. 12 is a block diagram illustrating an exemplary configuration of an MFP according to a second embodiment.

A second embodiment will be described below. The second embodiment is an exemplary application of the information processing apparatus 1 according to the above-described first embodiment to an MFP 100 that integrates a plurality of functions including an image scanning function, a printing function, a fax function, and a copying function. FIG. 12 illustrates an exemplary configuration of the MFP 100 according to the second embodiment.

In a control unit 110, a CPU 121, a RAM 122, a HDD 123, and peripheral component interconnect (PCI) buses 115 and 130 are connected to an application specific integrated circuit (ASIC) 120.

For example, a serial I/F 140, a network interface card (NIC) 141, a USB device 142, a USB host controller 143, and other pieces of hardware (H/W) 144 are connected to the PCI bus 130.

The ASIC 120 arbitrates communication between the CPU 121, and each of the RAM 122, the HDD 123, and the PCI bus 130. The HDD 123 stores therein in advance various types of data and a computer program for operating the CPU 121. According to the program previously stored in the HDD 123 and using the RAM 122 as a work memory, the CPU 121 controls general operations of the image forming apparatus 100. Functions of the CPU 121, the RAM 122, the HDD 123, the PCI bus 130, and the ASIC 120 correspond to the functions of the control unit 10 illustrated in FIG. 1.

The HDD 123 may temporarily store therein intermediate data generated as the program runs, or store therein, for example, image data supplied via the PCI bus 115 as will be described later. In addition, a control signal from an operating section 114 generated according to a user operation is supplied to the CPU 121 via the ASIC 120. This permits control of the MFP 100 according to the user operation. The operating section 114 corresponds to the input I/F 12 and the display control unit 13, and the input device 21 and the display 22 connected thereto illustrated in FIG. 1.

The application 30, the graphics I/F 31, and the OS 32 illustrated in FIG. 2 are achieved by a computer program operating on the CPU 121. The USB stack 40 included in the OS 32 is achieved as a module of the program operating on the CPU 121. Each of the class drivers and the list 45 included in the class driver group 44 of the USB stack 40 are held by, for example, the HDD 123.

The serial I/F 140 is an interface for serial communication, such as RS-232C. The NIC 141 controls communication relative to the Internet or a local area network (LAN). The USB device 142 is built into the image forming apparatus 100 and used in a fixed manner. The USB host controller 143 controls the USB device 142. A USB device 102 as an external device can be connected to the USB host controller 143. The USB host controller 143 corresponds to the USB host controller 11 illustrated in FIG. 1.

A scanner unit 111, a plotter unit 112, and a fax control unit 113 are connected to the PCI bus 115. The scanner unit 111 scans a document image and outputs the document image as image data. The output image data is supplied to the CPU 121 via the PCI bus 115 and the ASIC 120 and stored in the HDD 123. The plotter unit 112 performs printing on paper based on the image data, which may be supplied to the plotter unit 112 via the ASIC 120 and the PCI bus 115 after read from the HDD 123, for example. The fax control unit 113 is connected to, for example, a public telephone network and transmits a document image scanned with the scanner unit 111 to a specified recipient.

The USB stack 40 executed as a computer program in the MFP 100 according to the second embodiment is provided as being previously stored in, for example, the HDD 123. This is, however, not the only possible arrangement; alternatively, the USB stack 40 executed in the MFP 100 according to the second embodiment may be provided by being recorded as a file of an installable or executable format on a computer readable recording medium, such as a compact disk (CD), a flexible disk (FD), and a digital versatile disk (DVD).

Additionally, the USB stack 40 executed in the MFP 100 according to the second embodiment may still be provided by being stored on a computer connected to a network, such as the Internet, and downloaded over the network. The USB stack 40 executed in the MFP 100 according to the second embodiment may instead be provided or distributed over a network, such as the Internet.

The USB stack 40 that is the program executed in the MFP 100 according to the second embodiment is configured as a module that includes the different sections described earlier (the detecting section 41, the determining section 42, and the driver assigning section 43). In operation as hardware, the CPU 121 reads the USB stack 40 from, for example, the HDD 123 and executes the USB stack 40, whereby each of the foregoing sections is loaded on the main memory (e.g., the RAM 122), thus creating the detecting section 41, the determining section 42, and the driver assigning section 43 on the main memory. The class driver group 44 is read, as necessary, from the HDD 123 to the main memory as each of these sections is executed.

The present invention achieves an effect of preventing a USB device for which the class different from that to which the USB device originally belongs is set from operating in an unexpected manner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
    an acquiring unit that acquires, from an external device connected to a connector, identification information that indicates at least a function of the external device;
    a holding unit that holds a device driver for controlling the external device; and
    a control unit that controls an assignment of the device driver to the external device connected to the connector in accordance with control information, wherein the holding unit holds at least a generic device driver that performs a process not dependent on the function of the external device,
    when the control information indicates a first value, the control unit assigns the generic device driver to the external device connected to the connector,
    when the control information indicates a second value, the control unit performs a first determination for determining whether the holding unit holds a device driver compatible with the function of the external device indicated by the identification information acquired from the external device,
    when it is determined as a result of the first determination that the holding unit does not hold the device driver, the control unit assigns the generic device driver to the external device,
    when it is determined as a result of a second determination that model identifying information to identify a model of the external device does not exist in a list, the control unit performs a third determination for determining whether an assignment of the device driver compatible with the function of the external device indicated by the identification information to the external device is permitted, and
    when it is determined as a result of the third determination that the assignment is not permitted, the control unit assigns the generic device driver to the external device and changes the control information to the first value.

2. The information processing apparatus according to claim 1, wherein
    the identification information includes the model identifying information to identify the model of the external device,
    the holding unit further holds the list, which is of the model identifying information to identify the model of the external device for which an assignment of the function indicated by the identification information acquired from the external device is permitted, and
    when it is determined as a result of the first determination that the holding unit holds the device driver compatible with the function of the external device indicated by the identification information acquired by the acquiring unit from the external device, the control unit performs the second determination for determining whether the model identifying information exists in the list, on the basis of the model identifying information included in the identification information.

3. The information processing apparatus according to claim 2, wherein the control unit performs the third determination in accordance with a user input.

4. The information processing apparatus according to claim 2, wherein
    when it is determined as a result of the third determination that the assignment is permitted,
    the control unit adds to the list the model identifying information to identify the model of the external device for which the assignment of the device driver is permitted.

5. The information processing apparatus according to claim 1, wherein
    after the control unit assigns the generic device driver to the external device,
    the control unit cancels the assignment of the generic device driver to the external device in accordance with a user input and changes the control information to the second value.

6. An information processing method comprising:
    acquiring, from an external device connected to a connector, identification information that indicates at least a function of the external device;
    holding a device driver for controlling the external device; and
    controlling an assignment of the device driver to the external device connected to the connector in accordance with control information, wherein
    the holding includes holding at least a generic device driver that performs a process not dependent on the function of the external device,
    when the control information indicates a first value, the controlling includes assigning the generic device driver to the external device connected to the connector,
    when the control information indicates a second value, the controlling includes performing a first determination for determining whether the holding holds a device driver compatible with the function of the external device indicated by the identification information acquired from the external device,
    when it is determined as a result of the first determination that the holding does not hold the device driver, the controlling includes assigning the generic device driver to the external device,
    when it is determined as a result of a second determination that model identifying information to identify a model of the external device does not exist in a list, the controlling performs a third determination for determining whether an assignment of the device driver compatible with the function of the external device indicated by the identification information to the external device is permitted, and
    when it is determined as a result of the third determination that the assignment is not permitted, the controlling assigns the generic device driver to the external device and changes the control information to the first value.

7. A computer program product comprising a non-transitory computer-readable medium having computer-readable program codes embedded therein, the program codes when executed causing a computer to execute:
    acquiring, from an external device connected to a connector, identification information that indicates at least a function of the external device;
    holding a device driver for controlling the external device; and controlling an assignment of the device driver to the external device connected to the connector in accordance with control information, wherein the holding includes holding at least a generic device driver that performs a process not dependent on the function of the external device, when the control information indicates a first value, the controlling includes assigning the generic device driver to the external device connected to the connector, when the control information indicates a second value, the controlling includes performing a first determination for determining whether the holding holds a device driver compatible with the function of the external device indicated by the identification information acquired from the external device, when it is determined as a result of the first determination that the holding does not hold the device driver, the controlling includes assigning the generic device driver to the external device, when it is determined as a result of a second determination that model identifying information to identify a model of the external device does not exist in a list, the controlling performs a third determination for determining whether an assignment of the device driver compatible with the function of the external device indicated by the identification information to the external device is permitted, and when it is determined as a result of the third determination that the assignment is not permitted, the controlling assigns the generic device driver to the external device and changes the control information to the first value.

* * * * *